Feb. 18, 1958    R. L. CRANE    2,823,446
FILING MACHINE

Filed Feb. 16, 1955    9 Sheets-Sheet 1

Inventor
Robert L. Crane
By
Attorney

Feb. 18, 1958 R. L. CRANE 2,823,446
FILING MACHINE
Filed Feb. 16, 1955 9 Sheets-Sheet 3

Feb. 18, 1958  R. L. CRANE  2,823,446
FILING MACHINE
Filed Feb. 16, 1955  9 Sheets-Sheet 5
Fig. 5.
Fig. 6.
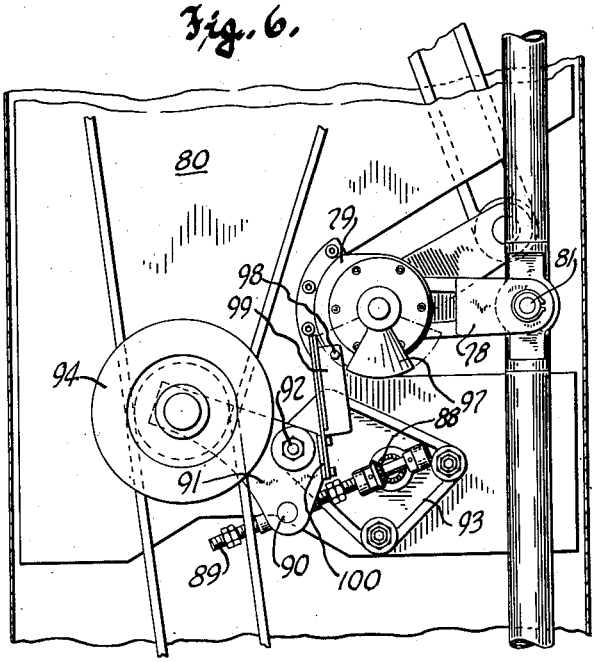
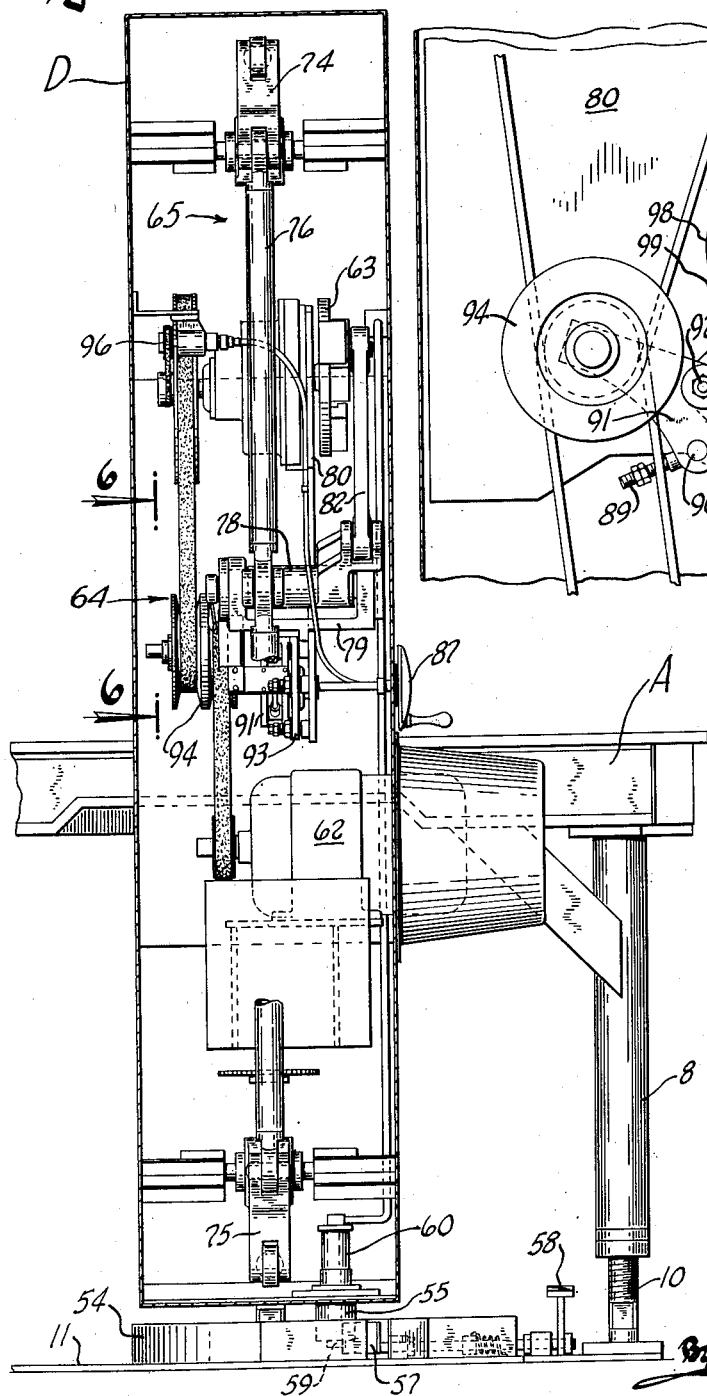
Inventor
Robert L. Crane
By Trahullon Jones
Attorney Feb. 18, 1958 R. L. CRANE 2,823,446
FILING MACHINE
Filed Feb. 16, 1955 9 Sheets-Sheet 6

Inventor
Robert L. Crane
By Ira Milton Jones
Attorney

Feb. 18, 1958 R. L. CRANE 2,823,446
FILING MACHINE
Filed Feb. 16, 1955 9 Sheets-Sheet 7

Inventor
Robert L. Crane
By Ira Milton Jones
Attorney

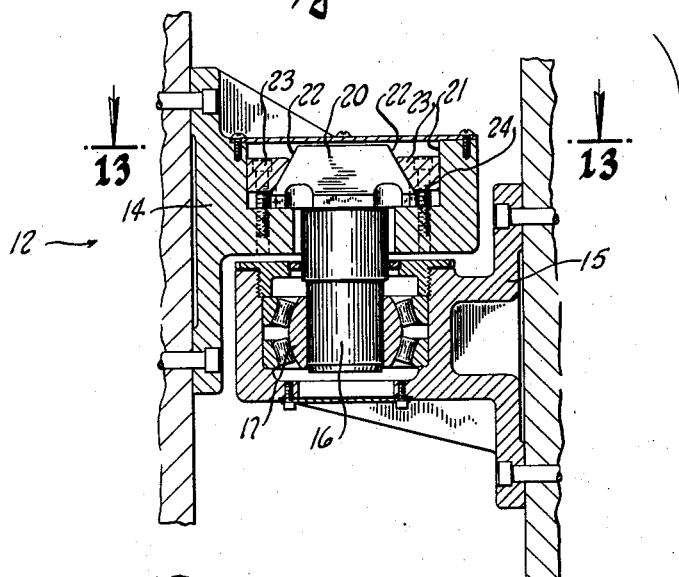
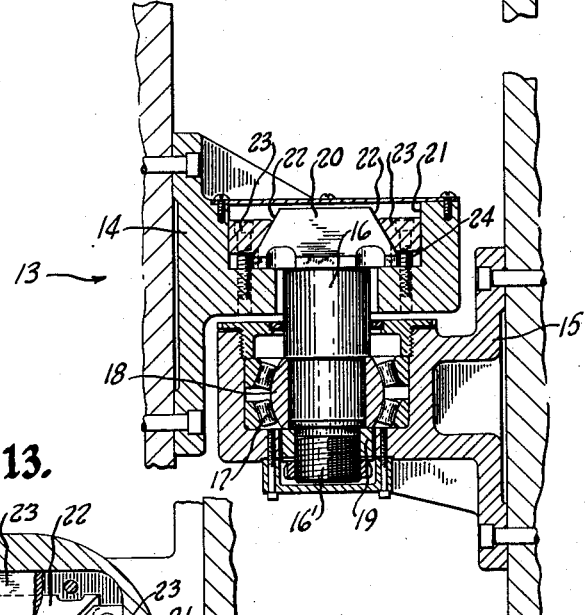
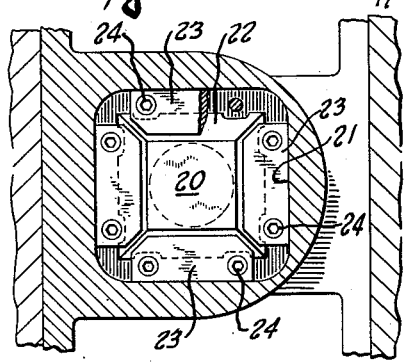

Feb. 18, 1958 — R. L. CRANE — 2,823,446
FILING MACHINE
Filed Feb. 16, 1955 — 9 Sheets-Sheet 9

Inventor
Robert L. Crane
By Ira Milton Jones
Attorney

United States Patent Office 2,823,446
Patented Feb. 18, 1958

2,823,446

FILING MACHINE

Robert L. Crane, Hopkins, Minn., assignor to Continental Machines, Inc., Savage, Minn., a corporation of Minnesota Application February 16, 1955, Serial No. 488,536

9 Claims. (Cl. 29—76)

This invention relates to machine tools and has as its purpose to provide a filing machine especially adapted for use in filing large dies and other work pieces too large and heavy to be handled by ordinary filing machines. In the conventional filing machine in which an endless file band or element moves downwardly through a work zone, the work is moved about on a suitable table as required to present the selected areas thereof to the file element. By contrast, in the filing machine of this invention the work remains stationary while the file element and its power drive means are moved about as needed to perform the machining operation.

To enable this new mode of operation the invention has as one of its objects to provide a machine wherein the frame member upon which the file element and its drive are mounted is swingably supported from a fixed pedestal by means of a double hinged mounting.

More specifically it is an object of this invention to provide a machine tool of the character described in which the work performing tool element, i. e. the file, and the drive therefor, are mounted on a rigid C-shaped member hingeably supported on the outer end of an arm which in turn is vertically hinged to a fixed pedestal, with the arms of the C-shaped member above and below a horizontal work supporting table and the file, which extends across the throat of the C-shaped member, passing through an opening in the table and the work piece thereon. This enables the file to be moved to any location on the work piece within the perimeter or boundary of the hole or opening in the table.

With a view toward assuring absolutely vertical alignment of the hinge axes of the double hinged mounting for the C-shaped frame or carrier member, this invention has as another of its objects to provide means for very accurately shifting the hinge pins laterally in any direction.

Another object of this invention is to provide means for limiting swinging movement of the C-shaped file carrying member to prevent engagement of the file with the edge of the hole or opening in the work supporting table.

Another object of this invention is to provide a filing machine wherein the file, moving linearly or longitudinally in a vertical path, not only may be shifted about at will to bring the file to any selected part of the stationary work piece, but also may be rotated about its axis.

In this connection, it is another object of this invention to provide handle means by which an operator may manually rotate the file element on its axis and at the same time shift it bodily from one position to another with respect to the stationary work piece.

Another object of this invention is to provide a machine tool, and more especially a filing machine, wherein the tool element namely, the file, is longitudinally reciprocable at an infinitely variable speed ranging from approximately fifty to about three hundred fifty strokes per minute and wherein the length of the stroke is adjustable from zero to nine inches.

Since the stresses in the machine multiply very rapidly with increase in the length of the stroke and/or increase in speed or frequency thereof, it is another object of this invention to provide an interlock between the means for varying the speed at which the tool element is reciprocated and the means by which the length of its stroke is adjusted which interlock will prevent operation of the machine at maximum speed when the stroke adjustment is set at maximum to thereby limit the stresses to a safe value.

With the above and other objects in view, which will appear as the description proceeds, this invention resides in the novel method and construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

Figure 5 is a vertical sectional view through Figure 2 on the plane of the line 5—5;

Figure 6 is a detail sectional view through Figure 5 on the plane of the line 6—6 and illustrating particularly the variable speed drive transmission by which the rate of reciprocation imparted to the file element by the drive motor acting through the linkage shown in Figure 4 is infinitely variable;

Figure 7 is a fragmentary detail view illustrating the manner in which the length of the stroke of the reciprocable file reciprocating mechanism may be adjusted;

Figure 12 is a vertical sectional view through one of the hinged connections by which the movable frame elements of the machine are connected to one another and to the supporting pedestal;

Figure 13 is a horizontal sectional view through Figure 12 on the plane of the line 13—13;

Referring now particularly to the accompanying drawings in which like numerals indicate like parts throughout the several views, the machine comprises the following main elements: a stationary work support A; a fixed pedestal B; an arm or hinge member C hingedly connected to and supported from the pedestal; a C-shaped rigid frame or carrier member D hinged to and supported from the outer end of the arm C; and a tool element E.

Figure 1:
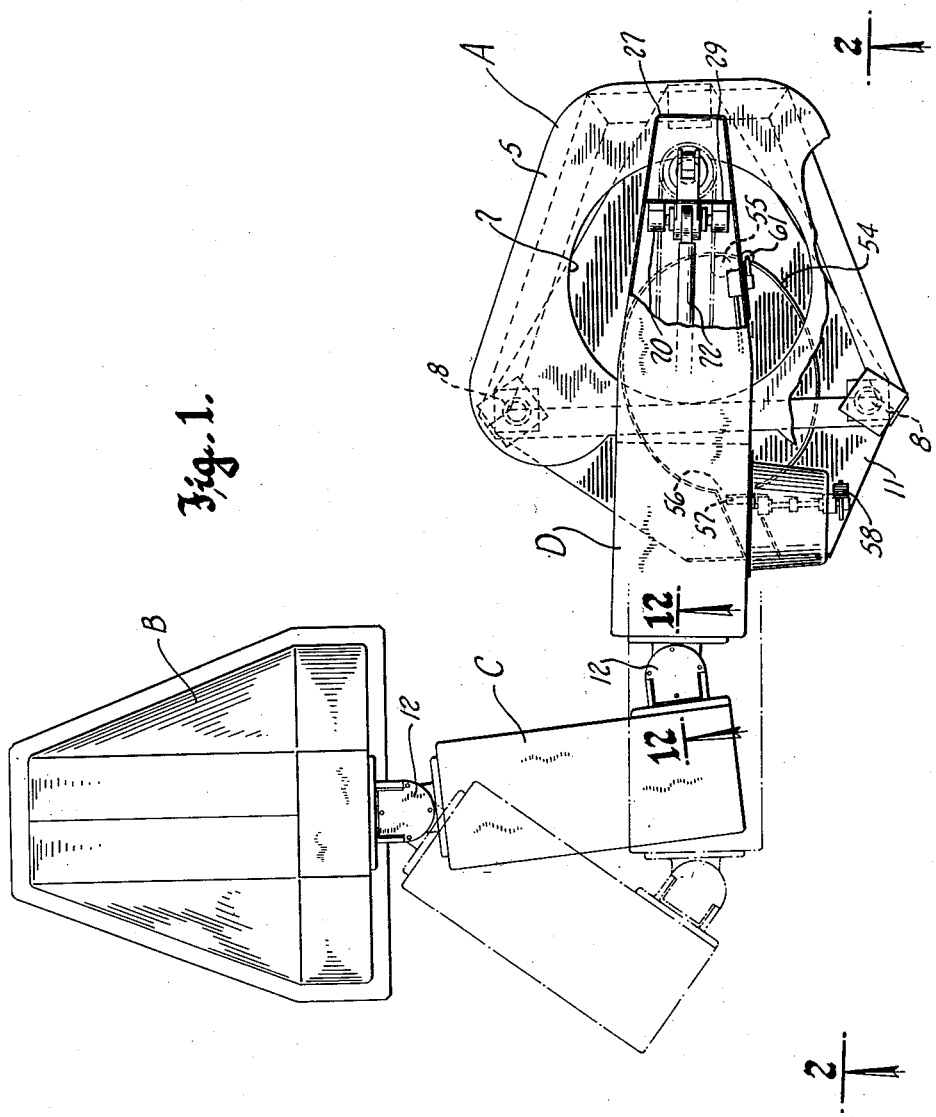
Figure 1 is a top plan view of a filing machine embodying this invention.
Figure 2:
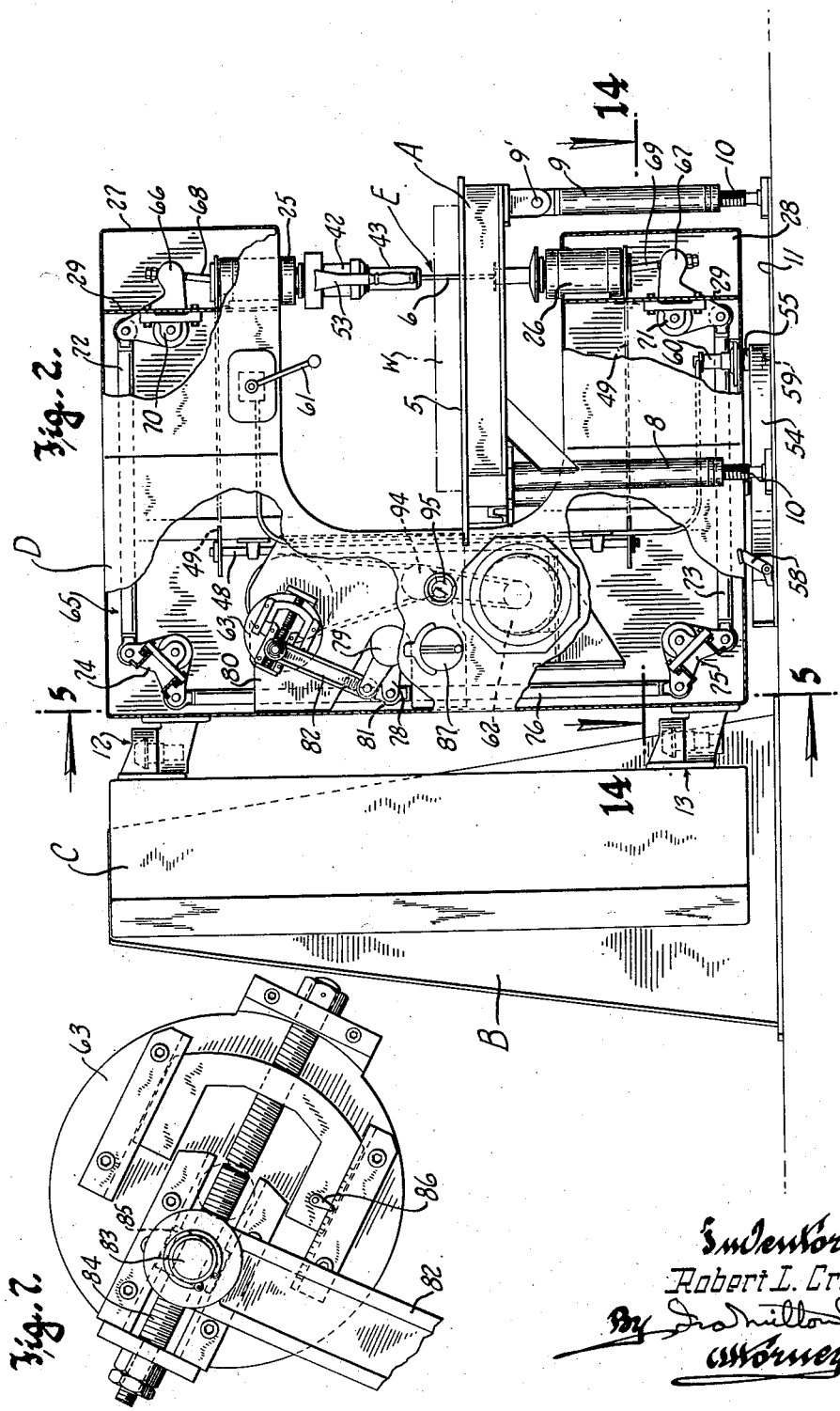
Figure 2 is a side view of the machine taken on the plane of the line 2—2 in Figure 1, parts thereof being broken away to better illustrate details.
Figure 3:
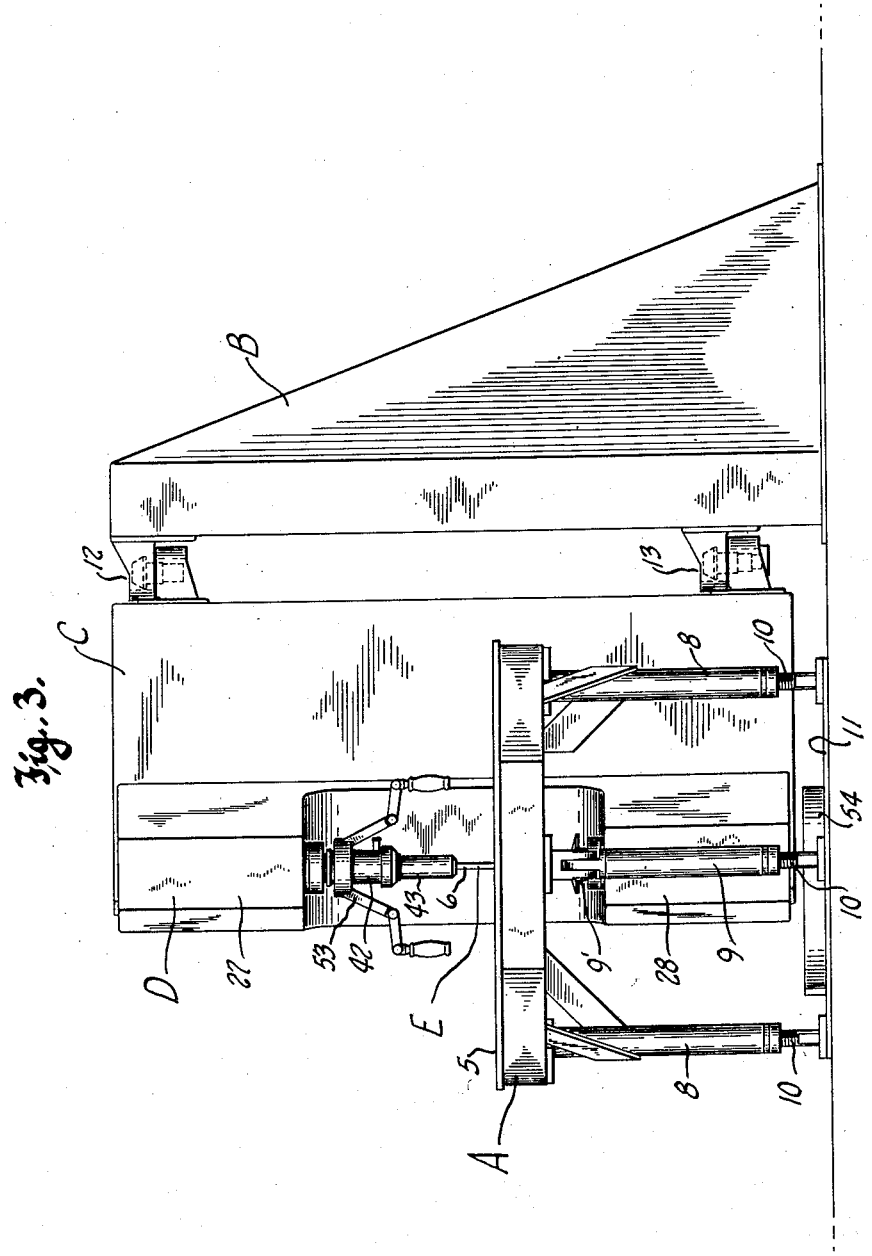
Figure 3 is an end view of the machine viewing the same from the right in Figure 2.

As seen in Figure 1, the arm or hinge member C extends outwardly away from one upright side of the pedestal, substantially at right angles thereto, and its swinging motion is limited by the pedestal to an angle of less than 180° or roughly about 65° to opposite sides of its position shown. The carrier member D is shown extending outwardly away from one side of the arm or hinge member C, substantialy at right angles to the horizontal dimension of the arm, and its swinging motion relative to the arm is limited by the latter to an angle considerably less than 180° or roughly about 65° to opposite sides of its position shown in Figure 1.

The pedestal B is fixed to a suitable foundation or base and the axes of the hinged connections between the pedestal, the arm C and the carrier member D are exactly vertical. The carrier member D is thus swingable on its double hinged mounting to and from an operative position at which its arms embrace, i. e. are above and below, the table 5 of the work support, and the tool element E which is mounted on the C-shaped carrier member D with its work performing portion, in this case a file element 6, constrained to vertical reciprocation along a path spanning the throat of the C-shaped carrier member, passes through a hole or opening 7 in the table.

The work support A has three legs, two of which, designated by the numeral 8, are rigidly fixed to its table 5 and the third, designated 9, being hingedly connected to the table as at 9'. All of the legs have leveling screws 10 in their lower ends provided with rounded heads which seat in sockets in pads fixed to a base plate 11. Accordingly the table 5 may be accurately leveled or set at any desired angle, within about five degrees from horizontal, to enable filing a clearance angle in a die when this is required.

It should be understood that in setting the machine up for operation the file element must be removed to enable the carrier member D to be swung to its operative position embracing the table 5 and the work piece W mounted thereon. The file element is then replaced.

Since accurate filing demands that the file element retain a truly vertical position at all times, it is essential that the hinge connections by which the carrier member D is swingably supported from the pedestal have their axes absolutely vertical at all times. Accordingly, special, very accurately adjustable hinges are provided. These hinges, as best shown in Figure 12, comprise upper and lower units 12 and 13 respectively and each unit consists of an upper bracket 14 and a lower bracket 15 connected by a hinge pin 16 fixed to the upper bracket and received in a self aligning bearing 17 mounted in the lower bracket. Only the lower hinge unit 13 carries the downward end thrust. For this purpose the inner race 18 of the lower bearing is secured to its hinge pin 16 by being clamped between a shoulder 16' on the pin and a nut 19 threaded on the lower end of the hinge pin, the outer race of the bearing being fixed in its bracket 15.

To assure that the axes of the hinge connections are truly vertical, the hinge pins 16 are laterally adjustable in their brackets 14. For this purpose the hinge pins have square heads 20 received in correspondingly shaped sockets 21 and the heads are tapered to provide inclined surfaces 22. Wedge blocks 23 are inserted between the inclined sides of the heads and the adjacent sides of the sockets so that by adjustment of the blocks the pins may be laterally shifted in any direction. Tension screws 24 provide for this adjustment.

The mounting of the tool element comprises upper and lower bearing housings 25 and 26 respectively mounted in the upper and lower arms 27 and 28 of the C-shaped carrier member D which like the pedestal B and the arm C is hollow and fabricated of plate steel. Thus the bearing housings 25 and 26 are substantially entirely within the arms 27 and 28, being secured therein in coaxially aligned relationship by being fastened to walls 29 fixed in said arms.

The housings 25 and 26 have sleeves 30 and 31 freely rotatably mounted therein by means of suitable bearings 32; and these sleeves have plungers 33 and 34 slidably but non-rotatably received therein. To hold the plungers against turning in the sleeves and still permit reciprocation thereof the walls of the sleeves have long keys 35 fixed therein and the plungers have short guides 36 slidably engaged with the keys.

The plungers have the opposite ends of the file element detachably connected thereto in a manner securing these parts against relative rotation, and although the upper and lower plungers are intended to reciprocate in unison, absolute synchronism of the plunger motion is only theoretically possible, hence means must be provided to compensate for the inevitable differences in plunger motions. This compensation is conveniently incorporated in the connection between the bottom end of the file element and its plunger 34. Accordingly this connection comprises a stud 37 having a head 37' slidable in a bore in the outer end of the plunger and a threaded shank 37" extending into the plunger. The head 37' has a square socket opening to its outer end in which the adjacent end of the file element is detachably secured as by a clamping screw. The shank 37" passes through a stop collar 38 threaded into the plunger 34 and has a relatively heavy coil spring 39 encircling it. This spring is confined between the bottom of the stop collar 38 and a stop nut threaded onto the shank. In the assembly of these parts the spring is placed under compression to draw the head of the stud down onto the top of the stop collar.

A cross pin 39' passing diametrically through the plunger 34, the stop collar 38 and an elongated hole in the stud 37 secures the stud and hence the file element against rotation with respect to the plunger without however interfering with spring resisted axial motion of the stud and the file element, it being understood that the connection of the upper end of the file element to the plunger 33 holds the head of the stud off the stop collar.

Since the plunger 34 projects from the upper end of the sleeve 31 directly under the work zone the top of the sleeve 31 is equipped with a packing gland 40 and a shield 41 encircling the gland to guard against filings working down into the sleeve and its splined connection with the plunger.

The connection between the upper end of the file element and its plunger 33 incorporates longitudinal adjustability so that file elements of different lengths may be used. This is desirable since where the work piece is relatively thin there would be no point in using a very long file element, and of course for thicker work, longer file elements should be used. Thus, the rotatable sleeve 30 has a downward extension which is adjustable in length and comprises a collet 42 fixed to the lower end of the sleeve 30 and a guide tube 43 slidable in the collet and projecting downwardly therefrom. A removable pin 44 is mounted in the collet to be engageable in any one of a series of holes 44' in the guide tube 43 and the clamping nut threaded on the bottom end of the collet provides means for rigidly locking the guide tube in its adjusted position.

The length of the plunger 33 is also adjustable, and for this purpose a plunger extension 45 is adjustably received in the lower end of the plunger. The extent the plunger extension projects from the plunger depends upon which of a series of holes a locking pin 47 engages. The bottom end of the plunger extension is enlarged and has a bushing thereon sliding in the bore of the guide tube 43. This enlarged lower end of the plunger extension has a socket similar to the socket in the head of the stud 37 and in which the upper end of the file element is detachably secured.

As already explained, the file element, by virtue of its securement to the plungers is rotatable about its axis and to make certain that both ends of the file element turn in unison the sleeves 30 and 31 are drivingly connected. The connection comprises a vertical shaft 48 rotatably mounted in the back of the C-shaped carrier member and a chain and sprocket connection 49 between this shaft and each sleeve.

To enable the operator to readily control the position of the file element the upper sleeve 30, and more particularly the collet 42 fixed thereto, has a yokelike handle 53 mounted thereon. By means of this handle member the file element may be rotated about its axis and the entire C-shaped carrier member may be easily moved about on its double-hinged support to bring the file element into engagement with any selected portion of the work piece lying within the perimeter of the hole or opening 7 in the table.

Since it would be undesirable to have the file element come in contact with the edge of the hole or opening 7, the swinging motion of the carrier member is defined and limited by a fence 54 projecting upwardly from the base plate 11 upon which the legs of the work support rest to be engaged by a downwardly projecting abutment or pin 55 on the bottom of the C-shaped carrier. Because of the double-hinged construction of the support for the carrier member D, the fence must have an elliptical shape, as seen in Figure 1.

To enable swinging the carrier member to an inoperative position clear of the work support, as would be desirable to facilitate loading the work on it and removing it from the support, the fence 54 has an exit opening 56 which is normally closed by a gate 57, the gate being controllable by a treadle 58.

In operation the C-shaped carrier member is always free to be manually moved or swung about as required to bring the file element into engagement with different areas of the work, but means are also provided for locking the carrier member in a fixed position, such locking being desirable to prevent accidental unwanted engagement of the file element with the work when the machine is left unattended. The means provided for this purpose comprises a stop pin or foot 59 projectable from the bottom of the C-shaped carrier member and against the base plate 11 by means of a pneumatic cylinder 60 controlled by the hand lever 61.

Figure 4:
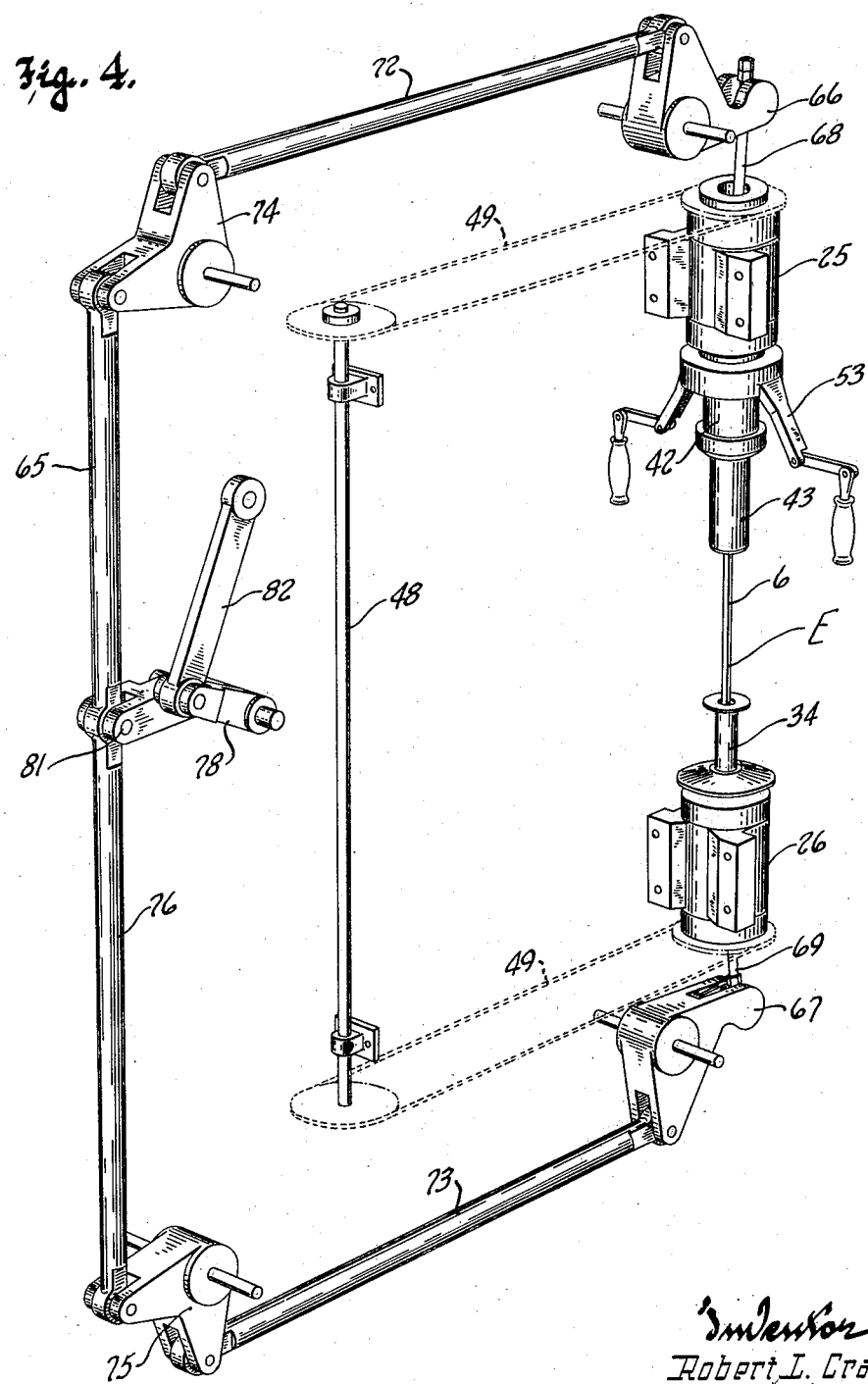
Figure 4 is a perspective view of the structure directly involved in the mounting of the file element and the linkage for driving the same.
Figures 8, 9:
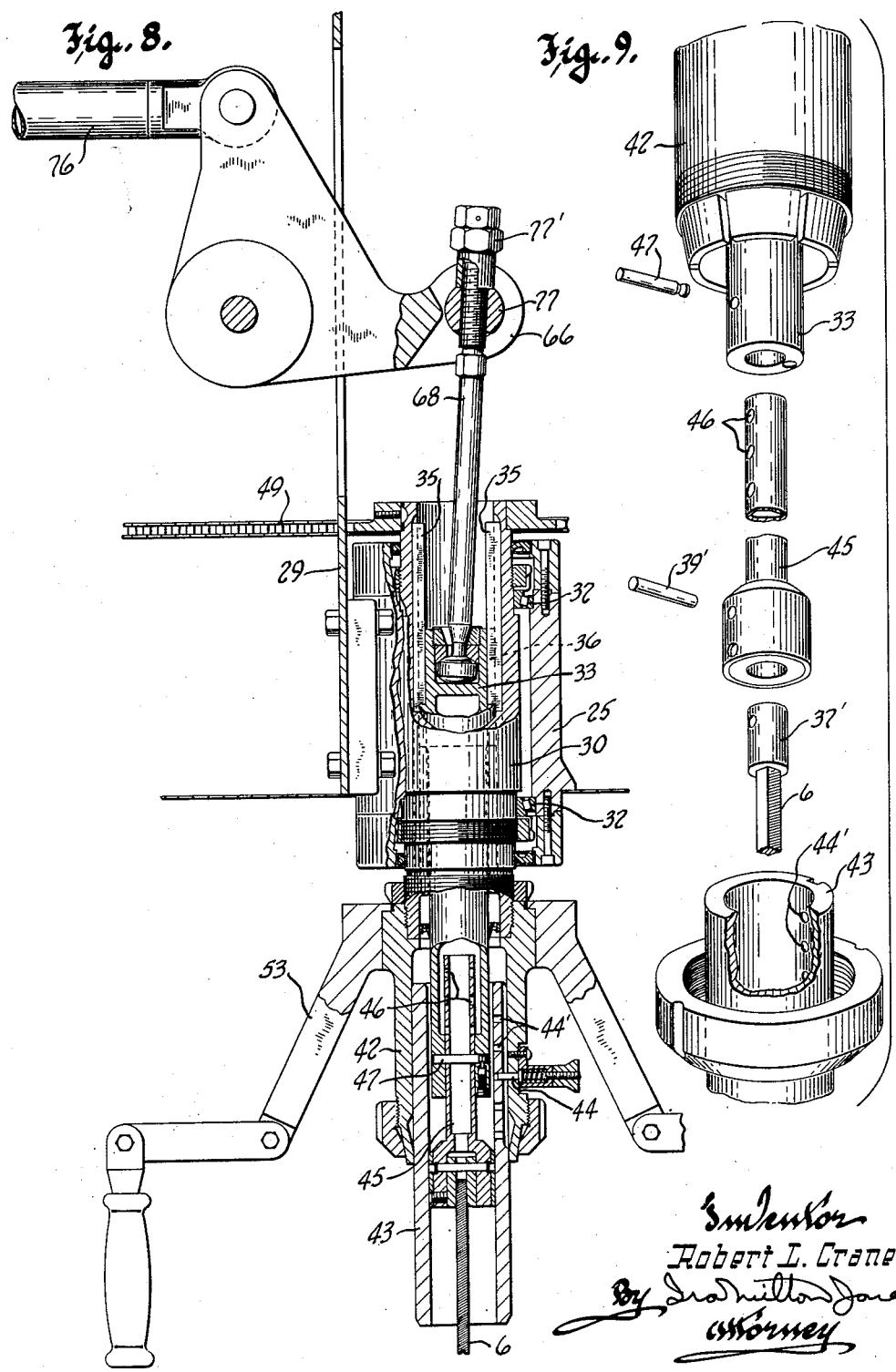
Figure 8 is a detail view on enlarged scale partly in elevation and partly in longitudinal section illustrating the upper mounting for the file element.
Figure 9 is an exploded perspective view of the main parts of the mounting for the upper end of the file element.
Figures 10, 11:
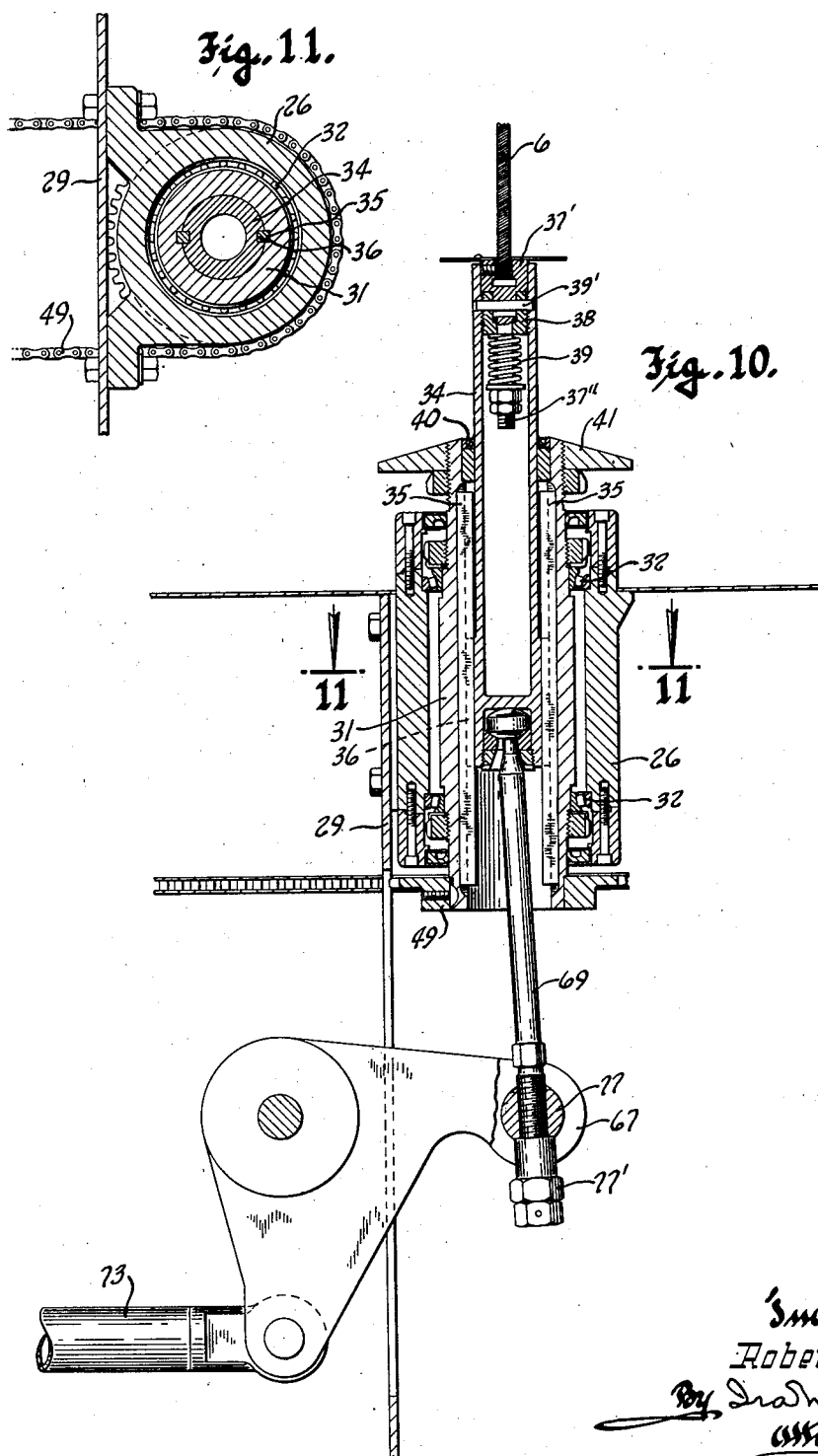
Figure 10 is a vertical sectional view through the mounting for the lower end of the file element.
Figure 11 is a cross sectional view through Figure 10 on the plane of the line 11—11.
Figure 14:
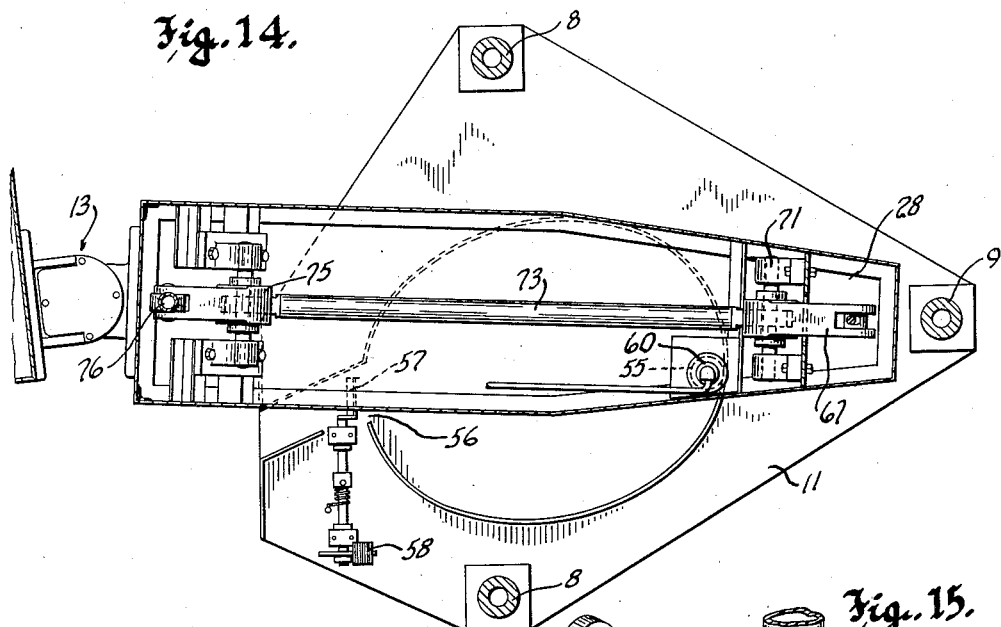
Figure 14 is a horizontal sectional view through Figure 2 taken on the plane of the line 14—14.

The power means for reciprocating the file element comprises a motor 62 which drives an adjustable throw crank 63 through a variable speed drive transmission 64, and linkage indicated generally by the numeral 65 and illustrated particularly in Figure 4. The linkage 65 comprises upper and lower rocker arms 66 and 67 respectively connected with the upper and lower plungers 33 and 34 by push-pull rods 68 and 69. The rocker arms 66 and 67 are essentially bell cranks and are mounted in the upper and lower arms 27 and 28 of the C-shaped carrier member by bearings 70 and 71 fixed to the adjacent walls 29 of the carrier member.

Horizontal links 72 and 73 connect the rocker arms 66 and 67 with bell crank levers 74 and 75 respectively. These bell crank levers are mounted to rock about fixed axes and are connected together by a vertical link 76. Accordingly vertical reciprocation of the link 76 imparts vertical reciprocation to the tool element.

Play and looseness in this linkage is taken up at the connections between the rocker arms 66 and 67 with the rods 68 and 69 respectively, and to this end the outer ends of the rods 68 and 69 are threaded and screwed into trunnions or pins 77 in the rocker arms. Thus by rotation of the rods 68 and 69 or either one of them the entire linkage may be placed in tension, and when so adjusted, the rods are secured against accidental rotation by lock nuts 77'.

Figure 16:
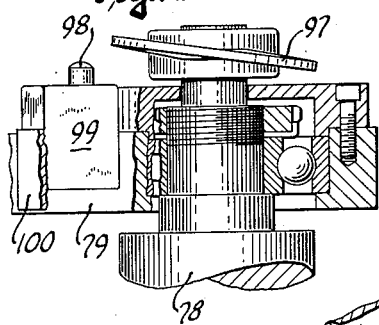
Figure 16 is a detail view partially in plan and partially in horizontal section illustrating a portion of the interlocking mechanism shown in Figure 15.

The driving connection between the variable speed transmission 64 and the linkage 65 comprises a lever arm 78 mounted to rock about a fixed axis in bearings carried by a bracket 79. One of these bearings is shown in Figure 16, and as best shown in Figures 5 and 6 the bracket 79 is secured to a partition wall 80 fixed in the back portion of the C-shaped carrier member. The rocker arm 78 is connected to the vertical link 76 as at 81 and is drivingly connected through a connecting rod 82 with the pin 83 of the adjustable crank 63.

Since the crank 63 is drivingly connected to the motor 62 it follows, of course, that rotation of the crankshaft effects rocking motion of the rocker arm 78, and consequently produces the desired motion in the linkage 65. The extent of this motion and hence the length of the stroke of the file element is determined by the throw of the crank pin 83, and as best shown in Figure 7 this adjustment is produced by a screw 84 restrained against endwise displacement with respect to the axis of rotation of the crank and threaded in a crosshead 85 on which the crank pin 83 is mounted. An indicator 86 driven by an oppositely threaded extension of the screw 84 provides means for visually indicating the length of the stroke imparted to the file element. In the embodiment of the invention shown the length of the stroke is variable from zero to nine inches.

The speed or frequency of the strokes of the file element is determined by the adjustment of the variable speed drive transmission 64. This unit may be any suitable variable speed transmission, but in the present instance comprises a conventional variable speed pulley such as that shown in Patent No. 2,502,976 issued to Charles McLear on April 4, 1950. The means for adjusting the speed of the transmission comprises a manually adjusted wheel 87 conveniently mounted at the front of the C-shaped carrier member and drivingly connected through bevel gears 88 with a screw 89. The screw 89 is restrained against endwise displacement and is threaded in a nut 90 pivotally connected to a lever 91 which is mounted to swing about a fixed axis provided by a stub shaft 92 projecting from a mounting bracket 93 which in turn is fixed to the partition wall 80.

The lever 91 carries the adjacent axially adjustable input and output pulleys 94 of the variable speed pulley transmission on its outer end. In accordance with this type of variable speed drive transmission, the effective diameters of these pulleys are inversely adjusted to change the speed ratio as the pulleys are moved bodily toward or from the driving pulley on the motor 62. The speed setting is visually indicated on a dial 95, the pointer of which is connected through a flexible shaft with a pulley 96 driven off the crankshaft.

Figure 15:
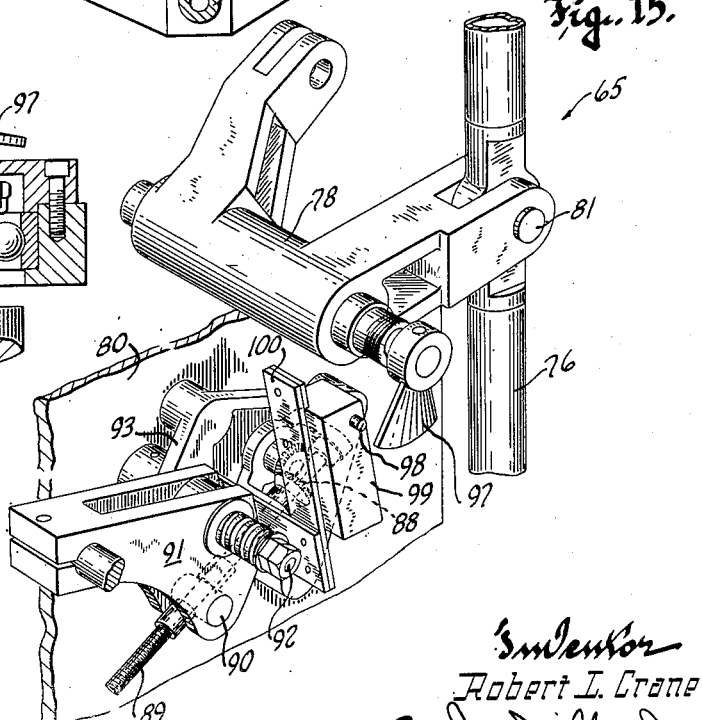
Figure 15 is a fragmentary perspective view of the mechanism by which the speed or rate of reciprocation of the file element and the length of its stroke are interlocked.

By virtue of this variable speed drive transmission the speed at which the file element is reciprocated is infinitely adjustable, for instance, from 50 to 350 strokes per minute; but as noted hereinbefore to limit the stresses set up in the machine to a safe value the speed or rate of reciprocation must be coordinated with the length of the stroke so that at maximum speed the stroke is shortest. To interlock the speed adjustment with the stroke adjustment and thereby prevent operation of the machine in a manner which will subject it to objectionably high stresses, the rocker arm 78 has a cam 97 mounted thereon (see Figure 15) to swing in an arcuate orbit through an angle which depends upon the stroke adjustment obtained by the setting of the throw of the crank pin 83.

The cam 97 is inclined with respect to the plane of its oscillation, as clearly shown in Figure 16, and is adapted to depress an actuator button 98 of a cutout switch 99 electrically connected into the control of the drive motor 62 in such a way that actuation of the switch by depression of the button 98 stops the motor. The switch 99 is mounted on an arm 100 which, in turn is fixed to the lever 91, and the parts are so oriented that the actuator button 98 is brought into and out of the orbit of the cam 97 by adjustment of the lever 91.

Moreover, the construction is such that upon swinging of the arm 91 in the direction to increase the speed of reciprocation of the file element, the switch actuating button 98 is brought farther into the orbit of the cam 97 so that a shorter angular travel of the cam will depress the button and stop the motor. Also by virtue of the fact that the angle through which the cam 97 swings increases with increase of the length of the stroke of the file element, it follows that the interengageable elements, namely the cam and the switch button, coact to in effect inversely relate speed or frequency and stroke. In other words, the coaction of these elements prevents the operation of the machine at high speed when the stroke adjustment is set to produce a long stroke.

From the foregoing description taken in connection with the accompanying drawings it will be readily apparent to those skilled in the art that this invention provides a filing machine of unusual capacity and flexibility, and that although the invention is especially well adapted to and has as its main purpose to provide a filing machine capable of handling work which is so large and heavy that it cannot be moved about and handled in the ordinary way by filing machines heretofore available, the invention is nevertheless also adaptable to embodiment in machines designed to handle smaller work, in which case it would only be necessary to clamp or otherwise secure the work piece to the work supporting table. It also follows that while the invention is especially concerned with a filing machine, its principles are applicable to jigsaws and even bandsaws.

Attention is directed to the fact that although in most instances the work to be performed requires the table to be absolutely level, the leveling screws in its legs provide for tilting the table the slight amount needed to provide a relief angle where this is required as in constricted passages of an extrusion die, and especially where such passages join larger less restricted parts of the die opening.

What is claimed as my invention is:

1. In a machine tool for performing work on a stationary work piece: a pedestal; a rigid C-shaped carrier member having an upright bight at its inner end and spaced arms projecting horizontally from the upper and lower portions of the bight to the outer end of the carrier member; a tool element; means mounting the tool element on the carrier member with a work performing portion of the tool element constrained to linear motion along a vertical path between the upper and lower arms of the carrier member near the outer end of the carrier member; power means on the carrier member for driving the tool element along said path; and means suspending the carrier member from the pedestal for free horizontal swinging motion in all directions, comprising an upright hinge member having an inner end adjacent to the pedestal, and extending horizontally therefrom toward the carrier member with its outer end adjacent to the bight of the carrier member, means providing an inner hinge connection between the pedestal and the adjacent inner portion of the hinge member to support the hinge member from the pedestal for swinging motion about a vertical axis fixed with respect to the pedestal, and means providing an outer hinge connection between the bight portion of the carrier member and the adjacent outer end portion of the hinge member, comprising complementary hinge parts on the side of one of said members and on the end of the other member, and by which the carrier member extends to one side of the hinge member and is supported thereby for swinging motion relative thereto about a vertical axis spaced from the axis of said inner hinge connection as well as for bodily swinging motion with the hinge member about the axis of said inner hinge connection, said carrier member being substantially longer in its horizontal dimension than the hinge member so that swinging motion of the carrier member relative to the hinge member enables the work performing portion of the tool element to be carried along an arc of substantial radius, while bodily swinging motion of the carrier member with the hinge member enables the work performing portion of the tool element to be carried to any point within a relatively large area for engagement with any selected part of a stationary work piece embraced by the carrier arms and located within said area.

2. In a machine tool for performing work on a stationary work piece: means providing a stationary horizontal work support adapted to receive and hold a work piece in fixed relation to the work support, said work support having an opening therein; a pedestal spaced from the work support; a rigid C-shaped carrier member having an upright bight at its inner end and spaced upper and lower arms projecting horizontally from the upper and lower portions of the bight to the outer end of the carrier member; a tool element; means mounting the tool element on the carrier member with a work performing portion of the tool element constrained to linear motion along a vertical path between the upper and lower arms of the carrier member and near the outer end of the carrier member; power means on the carrier member for driving the tool element along said path; and means suspending the carrier member from the pedestal for free horizontal swinging motion in all directions with the arms of the carrier member above and below the work support to embrace a work piece thereon, and with the work performing portion of the tool element passing vertically through the opening in the work support, said suspending means comprising an upright hinge member having an inner end adjacent to the pedestal, and extending horizontally therefrom toward the carrier member with its outer end adjacent to the bight of the carrier member, means providing an inner hinge connection between the pedestal and the adjacent inner portion of the hinge member to support the hinge member from the pedestal for swinging motion about a vertical axis fixed with respect to the pedestal, and means providing an outer hinge connection between the bight portion of the carrier member and the adjacent outer end portion of the hinge member, comprising complementary hinge parts on the side of one of said members and on the end of the other member, and by which the carrier member extends to one side of the hinge member and is supported thereby for swinging motion relative thereto about a vertical axis spaced from the axis of said inner hinge connection as well as for bodily swinging motion with the hinge member about the axis of said inner hinge connection, said hinge connections enabling the carrier member to be freely swung in all horizontal directions relative to a work piece on the work support to bring the work performing portion of the tool element into engagement with any selected part of a stationary work piece on the work support, within the bounds of the opening in the work support.

3. The machine tool set forth in claim 2, further characterized by the provision of means for limiting the swinging motion of the carrier member to prevent the tool element coming into engagement with the edge of the opening in the work support.

4. In a machine tool for performing work on a stationary work piece: a pedestal adapted to be fixed to a horizontal supporting surface and having an upright side; a rigid C-shaped carrier member having an upright elongated bight at its inner end and spaced arcs projecting horizontally from the support and lower portions of the bight to the outer end of the carrier member; a tool element; means mounting the tool element on the carrier member with a work performing portion of the tool element constrained to linear motion along a vertical path between the upper and lower arms of the carrier member near the outer end of the carrier member; power means on the carrier member for driving the tool element along said path; and means suspending the carrier member from the pedestal for free motion relative thereto in all horizontal directions over said supporting surface, comprising a hinge member having upright inner and outer ends, inner vertical hinge means connecting said inner end of the hinge member to said side of the pedestal with the hinge member extending outwardly away from said side of the pedestal and free to swing horizontally back and forth substantially equal angular distances to opposite sides of a vertical plane containing the hinge axis and normal to said side of the pedestal, and outer vertical hinge means connecting the outer portion of the hinge member to the bight portion of the C-shaped carrier member with the carrier member normally extending outwardly away from one side of the hinge member in a direction substantially normal to the horizontal dimension of the hinge member, said outer hinge means comprising cooperating hinge parts on the side of one of said members and on the end of the other member, said inner and outer hinge means providing for free bodily movement of the carrier member with the hinge member upon said inner hinge means and providing for free horizontal swinging motion of the carrier member relative to the hinge member upon said outer hinge means substantially equal angular distances to opposite sides of a vertical plane normal to the horizontal dimension of the hinge member but with each of said last named distances limited to an angle substantially less than 90° so that force applied manually to the outer portion of the carrier member to swing the same bodily with the hinge member about said inner hinge means will always be transmitted by the carrier member to the outer portion of the hinge member at such angles to the horizontal dimension of the hinge member as produce the greatest forces on the hinge member effective to swing it upon said inner hinge means; and said carrier member being substantially longer in its horizontal dimension than the hinge member.

5. The machine tool set forth in claim 1, further characterized by the fact that the means for mounting the tool element on the carrier member comprises aligned upper and lower bearing units rigidly fixed to the upper and lower arms of the carrier member; a sleeve rotatably journaled in each of said bearing units; means providing a torque transmitting connection between each sleeve and the tool element, said means enabling free linear motion of the tool element with respect to the sleeves; means connecting the sleeves to constrain the same to rotate in unison; the upper sleeve having a portion projecting down from its bearing unit; and handle means fixed to said downwardly projecting portion of the upper sleeve so that said handle means is beneath said upper bearing unit to provide conveniently located means for manually rotating the tool element while it is moving linearly and performing work.

6. The machine tool of claim 1 further characterized by the fact that the tool element is reciprocable; and by the fact that the drive for the tool element comprises linkage connected to the opposite ends of the tool element, and means including an adjustable throw crank and a variable speed transmission drivingly connecting the linkage with the power means so that both the length of the stroke of the tool element and the speed and frequency thereof may be adjusted.

7. The machine tool of claim 6 further characterized by the provision of means for interlocking the variable speed transmission and the adjustable throw crank to prevent concurrence of maximum speed and maximum throw, said interlocking means comprising a cam connected with the linkage to move in unison therewith so that the extent of movement of the cam depends upon the throw of the crank, and a control for the power means including an actuator mounted upon part of the means for adjusting the variable speed transmission in a position to bring the actuator farther into the path of the cam as the speed of reciprocation is increased.

8. The machine tool of claim 2 further characterized by the provision of: means for limiting the swinging adjustment of the carrier member to prevent the tool element coming into engagement with the edge of the opening in the work support, said means comprising a fence fixed with respect to the pedestal and positioned beneath the C-shaped carrier member; and an abutment projecting downwardly from the carrier member into the area bounded by the fence to be engageable therewith.

9. The machine tool of claim 8 further characterized by the fact that the tool element is detachable from its mounting means; by the fact that the fence has an exit opening through which said abutment may be passed to enable swinging the carrier member to an inoperative position in which its arms do not embrace the work support upon detachment of the tool element from its mounting means; and a gate for said exit opening.

References Cited in the file of this patent

UNITED STATES PATENTS

| | | |
|---|---|---|
| 82,585 | Baxter | Sept. 29, 1868 |
| 118,041 | Moore | Aug. 15, 1871 |
| 882,044 | Anderson | Mar. 17, 1908 |
| 1,779,981 | Nickerson | Oct. 28, 1930 |
| 1,797,088 | Howard | Mar. 17, 1931 |
| 2,490,281 | Rose | Dec. 6, 1949 |
| 2,551,268 | Hoffman | May 1, 1951 |
| 2,555,056 | Pence | May 29, 1951 |
| 2,583,950 | Kirschner | Jan. 29, 1952 |
| 2,601,717 | Rock | July 1, 1952 |
| 2,613,701 | Nathan | Oct. 14, 1952 |
| 2,657,421 | Polson | Nov. 3, 1953 |
| 2,675,602 | Kern | Apr. 20, 1954 |
| 2,745,320 | Groen | May 15, 1956 |
| 2,774,131 | Crane | Dec. 18, 1956 |